(12) United States Patent
Nair et al.

(10) Patent No.: US 7,958,091 B2
(45) Date of Patent: Jun. 7, 2011

(54) METHOD FOR FAST BULK LOADING DATA INTO A DATABASE WHILE BYPASSING EXIT ROUTINES

(75) Inventors: Sushil Nair, San Jose, CA (US); Anatol Zolotusky, Palo Alto, CA (US); Claude Charpentier, Redwood City, CA (US)

(73) Assignee: Ingrian Networks, Inc., Redwood City, CA (US)

( * ) Notice: Subject to any disclaimer, the term of this patent is extended or adjusted under 35 U.S.C. 154(b) by 549 days.

(21) Appl. No.: 11/707,622

(22) Filed: Feb. 15, 2007

(65) Prior Publication Data

US 2007/0214167 A1      Sep. 13, 2007

Related U.S. Application Data

(60) Provisional application No. 60/774,897, filed on Feb. 16, 2006.

(51) Int. Cl.
- *G06F 7/00* (2006.01)
- *G06F 17/00* (2006.01)
- *G06F 9/46* (2006.01)

(52) U.S. Cl. .................. 707/643; 718/101; 718/105

(58) Field of Classification Search .............. 707/1, 102, 707/104.1, 202, 643; 718/101, 105
See application file for complete search history.

(56) References Cited

U.S. PATENT DOCUMENTS

| | | | |
|---|---|---|---|
| 4,386,416 A | 5/1983 | Giltner | |
| 4,964,164 A | 10/1990 | Fiat | |
| 5,142,272 A | 8/1992 | Kondo | |
| 5,222,133 A | 6/1993 | Chou et al. | |
| 5,463,702 A | 10/1995 | Trueblood | |
| 5,557,712 A | 9/1996 | Guay | |

(Continued)

FOREIGN PATENT DOCUMENTS

EP   0 946 018 B1   9/1999

(Continued)

OTHER PUBLICATIONS

"Using VTAM Generic Resources with IMS", by: Rick Long, Published 1999. http://www.redbooks.ibm.com/redbooks/pdfs/sg245487.pdf.*

(Continued)

*Primary Examiner* — Apu M Mofiz
*Assistant Examiner* — Chelcie Daye
(74) *Attorney, Agent, or Firm* — Drinker Biddle & Reath, LLP

(57) ABSTRACT

System, method, computer program for fast bulk loading data into database while bypassing exit routines. Method for bulk loading of data into database tables with exit routines defined for operations on such tables, method characterized by existence of exit routines is by-passed by performing data preprocessing in batch mode before loading; and loading preprocessed data into database by performing operations on lower level of tablespace and index spaces where database tables reside and not on database tables themselves. Method for bulk loading data into database tables with exit routines defined for operations on such tables comprising: batch processing data that requires processing to generate processed data; switching tablespace and related index spaces to stop mode; marking required space map entries used; loading previously processed data into claimed data pages; updating database index pages; resetting consistency tokens in updated page; and switching the tablespace and related index spaces to start mode.

21 Claims, 2 Drawing Sheets

U.S. PATENT DOCUMENTS

| | | | |
|---|---|---|---|
| 5,734,744 | A | 3/1998 | Wittenstein et al. |
| 5,764,235 | A | 6/1998 | Hunt et al. |
| 5,825,917 | A | 10/1998 | Suzuki |
| 5,828,832 | A | 10/1998 | Holden et al. |
| 5,848,159 | A | 12/1998 | Collins et al. |
| 5,923,756 | A | 7/1999 | Shambroom |
| 5,963,642 | A | 10/1999 | Goldstein |
| 5,999,629 | A | 12/1999 | Heer et al. |
| 6,021,198 | A | 2/2000 | Anigbogu |
| 6,061,448 | A | 5/2000 | Smith et al. |
| 6,073,242 | A | 6/2000 | Hardy et al. |
| 6,081,598 | A | 6/2000 | Dai |
| 6,081,900 | A | 6/2000 | Subramaniam et al. |
| 6,094,485 | A | 7/2000 | Weinstein et al. |
| 6,098,093 | A | 8/2000 | Bayeh |
| 6,098,096 | A | 8/2000 | Tsirigotis et al. |
| 6,105,012 | A | 8/2000 | Chang et al. |
| 6,154,542 | A | 11/2000 | Crandall |
| 6,202,157 | B1 | 3/2001 | Brownlie et al. |
| 6,216,212 | B1 | 4/2001 | Challenger et al. |
| 6,233,565 | B1 | 5/2001 | Lewis et al. |
| 6,233,577 | B1 | 5/2001 | Ramasubramani et al. |
| 6,237,033 | B1 | 5/2001 | Doeberl et al. |
| 6,321,201 | B1 | 11/2001 | Dahl |
| 6,396,926 | B1 | 5/2002 | Takagi et al. |
| 6,397,330 | B1 | 5/2002 | Elgamal et al. |
| 6,442,607 | B1 | 8/2002 | Korn et al. |
| 6,473,802 | B2 | 10/2002 | Masters |
| 6,477,646 | B1 | 11/2002 | Krishna et al. |
| 6,502,135 | B1 | 12/2002 | Munger et al. |
| 6,519,365 | B2 | 2/2003 | Kondo et al. |
| 6,553,393 | B1 | 4/2003 | Eilbott et al. |
| 6,578,061 | B1 | 6/2003 | Aoki et al. |
| 6,584,567 | B1 | 6/2003 | Bellwood et al. |
| 6,587,866 | B1 | 7/2003 | Modi et al. |
| 6,598,167 | B2 | 7/2003 | Devine et al. |
| 6,615,276 | B1 | 9/2003 | Mastrianni et al. |
| 6,621,505 | B1 | 9/2003 | Beauchamp |
| 6,640,302 | B1 | 10/2003 | Subramaniam et al. |
| 6,678,733 | B1 | 1/2004 | Brown et al. |
| 6,681,327 | B1 | 1/2004 | Jardin |
| 6,691,132 | B2* | 2/2004 | Walker et al. ............ 707/102 |
| 6,751,677 | B1 | 6/2004 | Ilnicki et al. |
| 6,757,823 | B1 | 6/2004 | Rao et al. |
| 6,763,459 | B1 | 7/2004 | Corella |
| 6,785,810 | B1 | 8/2004 | Lirov et al. |
| 6,874,089 | B2 | 3/2005 | Dick et al. |
| 6,886,095 | B1 | 4/2005 | Hind et al. |
| 6,915,427 | B2 | 7/2005 | Maruyama et al. |
| 6,941,459 | B1 | 9/2005 | Hind et al. |
| 6,963,980 | B1 | 11/2005 | Mattsson |
| 6,990,636 | B2 | 1/2006 | Beauchamp |
| 6,990,660 | B2 | 1/2006 | Moshir et al. |
| 7,137,143 | B2 | 11/2006 | Chawla et al. |
| 7,152,244 | B2 | 12/2006 | Toomey |
| 7,165,077 | B2* | 1/2007 | Kalies ............ 707/104.1 |
| 7,225,206 | B2* | 5/2007 | Isip, Jr. ............ 707/202 |
| 7,266,699 | B2 | 9/2007 | Newman et al. |
| 7,272,229 | B2 | 9/2007 | Nakano et al. |
| 7,305,410 | B2* | 12/2007 | Skopec et al. ............ 707/102 |
| 7,325,129 | B1 | 1/2008 | Mattsson et al. |
| 2002/0012473 | A1 | 1/2002 | Kondo et al. |
| 2002/0015497 | A1 | 2/2002 | Maruyama et al. |
| 2002/0016911 | A1 | 2/2002 | Chawla et al. |
| 2002/0039420 | A1 | 4/2002 | Shacham et al. |
| 2002/0042835 | A1* | 4/2002 | Pepin et al. ............ 709/232 |
| 2002/0066038 | A1 | 5/2002 | Mattsson et al. |
| 2002/0073232 | A1 | 6/2002 | Hong et al. |
| 2002/0087884 | A1 | 7/2002 | Shacham et al. |
| 2002/0100036 | A1 | 7/2002 | Moshir et al. |
| 2002/0112167 | A1 | 8/2002 | Boneh et al. |
| 2003/0014650 | A1 | 1/2003 | Freed et al. |
| 2003/0039362 | A1 | 2/2003 | Califano et al. |
| 2003/0046572 | A1 | 3/2003 | Newman et al. |
| 2003/0065919 | A1 | 4/2003 | Albert et al. |
| 2003/0097428 | A1 | 5/2003 | Afkhami |
| 2003/0101355 | A1 | 5/2003 | Mattsson |
| 2003/0123671 | A1 | 7/2003 | He et al. |
| 2003/0156719 | A1 | 8/2003 | Cronce |
| 2003/0197733 | A1 | 10/2003 | Beauchamp |
| 2003/0204513 | A1 | 10/2003 | Bumbulis |
| 2004/0015725 | A1 | 1/2004 | Boneh et al. |
| 2004/0255140 | A1 | 12/2004 | Margolus et al. |
| 2005/0004924 | A1 | 1/2005 | Baldwin |
| 2006/0041533 | A1 | 2/2006 | Koyfman |
| 2006/0117029 | A1* | 6/2006 | Yingst ............ 707/100 |
| 2006/0149962 | A1 | 7/2006 | Fountain et al. |
| 2007/0074047 | A1 | 3/2007 | Metzger et al. |
| 2007/0079140 | A1 | 4/2007 | Metzger et al. |
| 2007/0079386 | A1 | 4/2007 | Metzger et al. |

FOREIGN PATENT DOCUMENTS

| | | |
|---|---|---|
| WO | WO 01/03398 A3 | 1/2001 |
| WO | WO 02/101605 A2 | 12/2002 |

OTHER PUBLICATIONS

U.S. Appl. No. 10/526,252, filed Feb. 24, 2005, Fountain et al.

U.S. Appl. No. 10/850,827, filed May 20, 2004, Koyfman.

U.S. Appl. No. 11/236,046, filed Sep. 26, 2005, Metzger et al.

U.S. Appl. No. 11/236,294, filed Sep. 26, 2005, Metzger et al.

U.S. Appl. No. 11/236,061, filed Sep. 26, 2005, Metzger et al.

Wagner, Neal R., "The Laws of Cryptography: The RSA Cryptosystem", <http://www.cs.utsa.edu/~wagner/laws/RSA.html>.

Boneh, et al., "Efficient Generation of Shared RSA Keys," (extended abstract) 1999.

U.S. Appl. No. 11/341,060, filed Jan. 27, 2006, Metzger et al.

Menezes, A., et al., "Handbook of Applied Cryptography," 1996 CRC Press, pp. §8.2-8.3 and §14.5.

RSA "PKCS #1 v2.0 Amendment 1: Multi-Prime RSA," 2000.

Alteon Web Systems: "The Next Step in Server Loading Balancing" Nov. 1999, Retrieved from the Internet: URL:http:/www.nortelnetworks.com/products/library/collateral/intel_int/webworking_wp.pdf, Retrieved on Mar. 2, 2004; pp. 4-11.

Alteon Web Systems: "Networking with the Web in Mind" May 1999, Retrieved from the Internet: URL:http:/www.nortelnetworks.com/products/library/collateral/intel_int/webworking_wp.pdf, Retrieved on Mar. 2, 2004; p. 1, pp. 3-7.

Boneh, D., "Twenty Years of Attacks on the RSA Cyrptosystem," Notices of the AMS, vol. 46, No. 2, pp. 203-213, (1999).

Boneh, et al., "An Attack on RSA Given a Small Fraction of the Private Key Bits," Asiacrypt '98, LNCS 1514, pp. 25-34, (1998).

Boneh, et al., "Cryptanalysis of RSA with Private Key d Less than No. 292," (extended abstract), (1999).

Durfee, G., et al., "Cryptanalysis of the RSA Schemes with Short Secret Exponent from Asiacrypt '99," Asiacrypt 2000, LNCS 1976, pp. 14-29, (2000).

Fiat, A. "Batch RSA, (digital signatures and public key krypto-systems)" Advances in Crytology—Cryto '89 Proceedings Aug. 20-24, 1989, Springer-Verlag.

Großschädl, J., et al., "The Chinese Remainder Theorem and its Application in a High-Speed RSA Crypto Chip," (2000).

Herda, S., "Non-repudiation: Constituting evidence and proof in digital cooperation," Computer Standards and Interfaces, Elsevier Sequoia, Lausanne, Ch, 17:1 (69-79) (1995).

Immerman, N., "Homework 4 with Extensive Hints," (2000).

Menezes, A., et al., "Handbook of Applied Cryptography," 1996 CRC Press, pp. §8.2-8.3 and §14.

Netscape; "Netscape Proxy Server Administrator's Guide, Version 3.5 for Unix"; Feb. 25, 1998.

Oppliger, R.; "Authorization Methods for E-Commerce Applications"; (1999).

RSA Laboratories: "PKCS #7: Cryptographic Message Syntax Standard, Version 1.5," RSA Laboratories Technical Note, pp. 1-30, Nov. 1, 1993.

RSA "PKCS #1 v2.0 Amendment 1: Multi-Prime RSA," (2000).

"Security Protocols Overview (An RSA Data Security Brief)", RSA Data Security, http://www.comms.scitech.susx.ac.uk/fft/crypto/security_protocols.pdf, pp. 1-4 (1999).

Shacham, H., et al., "Improving SSL Handsake Performance via Batching," Topics in Cryptology, pp. 28-43, (2001).

Shand, M., et al., "Fast Implementations of RSA Cryptography," (1993).

Sherif, M.H., et al., "SET and SSL: Electronic Payments on the Internet," IEEE, pp. 353-358 (1998).

Stallings, W., "IP Security," Network Security Essentials, Applications and Standards, Chapters 6 and 7, pp. 162-223, (2000).

Takagi, T., "Fast RSA-Type Cryptosystem Modulo pkq," (1998).

Takagi, T., "Fast RSA-Type Cryptosystems Using N-Adic Expansion," Advances in Technology—Crypto '97, LNCS 1294, pp. 372-384, (1997).

Wiener, M., "Cryptanalysis of Short RSA Secret Exponents," (1989).

* cited by examiner

METHOD FOR FAST BULK LOADING DATA INTO A DATABASE WHILE BYPASSING EXIT ROUTINES

CROSS-REFERENCE TO RELATED APPLICATIONS

This application claims the benefit of priority under 35 U.S.C. 119(e) to U.S. Provisional Patent Application No. 60/774,897, filed 16 Feb. 2006 and entitled "Bulk Data Loader for a DB2 Database"; which application is hereby incorporated by reference.

This application also claims the benefit of priority under 35 U.S.C. 120 to U.S. Utility patent application Ser. No. 11/704,705 filed 8 Feb. 2007 and entitled "High Performance Data Encryption Server and Method For Transparently Encrypting/Decrypting Data"; which application claims the benefit of priority under 35 U.S.C. 119(e) to U.S. Provisional Patent Application No. 60/771,947 filed 8 Feb. 2006 entitled "High Performance Encryption Server"; each of which applications are hereby incorporated by reference.

FIELD OF THE INVENTION

This invention pertains generally to systems and methods for performing efficient on-line and off-line bulk data loading of data to a database, and more particularly to such on-line and off-line bulk data loading of data to an IBM DB2 type database that bypasses exit routines.

BACKGROUND

Various software systems and application programs running on an operating system make extensive use of exit routines or routines that have exit routine like properties. Among these software systems and application programs are the IBM DB2 database running on the IBM Z/OS operating system, which makes extensive use of exit routines. IBM, DB2, and Z/OS are registered trademarks of the International Business Machines Corporation.

Such exit routines, may for example, be used to implement or enable application-transparent operations such as data encryption, as described in co-pending U.S. Utility patent application Ser. No. 11/704,705 filed 8 Feb. 2007 and entitled "High Performance Data Encryption Server and Method For Transparently Encrypting/Decrypting Data"; incorporated by reference herein and assigned to Ingrian Networks, Inc. (of Redwood City, Calif., USA), the same assignee as the present patent application. In this example, field exit routines or table exit routines are defined for database tables (such as IBM DB2 tables) which contain encrypted fields.

Although exit routines provide useful computer program constructs in some situations, these same exit routines become a problem when a bulk operation, for example an operation that involves all of (or even a large amount of) the data from the database table, or loading the entire contents of a database table at once, needs to be performed. A problem with the use of bulk operations on such database tables (including with IBM DB2 database tables) with exit routines arises because the exit routines are invoked every time a row or a column, depending on the type of exit, needs to be modified or accessed. Such access may typically be either through the use of an SQL statement or through a LOAD utility.

This problem imposes a potentially unacceptable performance overhead for loading data in bulk, migrating un-encrypted data (such as for example when transforming one or more fields from the table, designated for encryption, from non-encrypted to encrypted form in the entire table at once), and for re-encrypting the already encrypted data (such as for example, in order to change the encryption key for the entire table at once). It is well known in the art that bulk operations on large database tables performed on a single row at a time, lead to unacceptable performance and are rejected by the industry's best practices. There remains a need therefore for a system and method that provide means for implementing bulk operations on database tables with exit routines defined for operations on such tables.

SUMMARY

Figure 1:
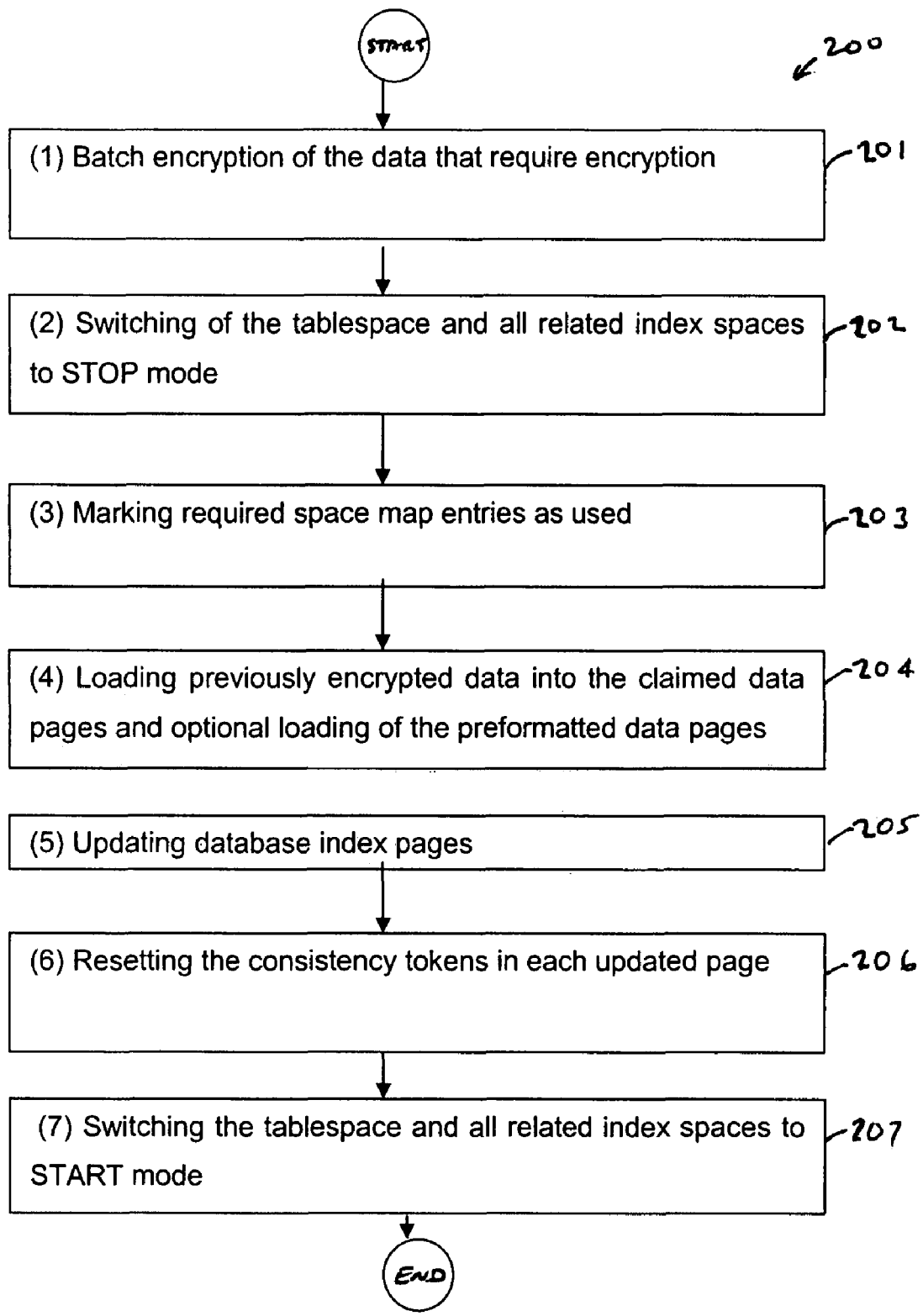
FIG. 1 is an illustration showing an exemplary embodiment of a method for bulk loading of encrypted data in an off-line mode.

In one aspect, embodiments of the invention provide a system, method, and computer program for fast bulk loading data into a database while bypassing exit routines.

In another aspect, embodiments of the invention provide a method for the bulk loading of data into the tables of a database with exit routines defined for operations on such tables, the method characterized in that: the existence of exit routines is by-passed by performing data preprocessing in batch mode before loading; and loading the preprocessed data into the database by performing operations on the lower level of tablespace and index spaces where the database tables reside and not on the database tables themselves.

In still another aspect, embodiments of the invention provide a method for the bulk loading of data into the tables of a database with exit routines defined for operations on such tables, the method comprising: batch processing data that requires processing to generate processed data; and switching database objects alternately between an accessible state and an inaccessible state, and while in an accessible state: (i) identifying needed resources for data to be loaded; (ii) loading the data into the database; and (iii) updating the database to reflect the changes resulting from the loading.

In even another aspect, embodiments of the invention provide a method for the bulk loading of data into the tables of a database with exit routines defined for operations on such tables, the method comprising: (1) batch processing of the data that requires processing to generate processed data; (2) switching of the tablespace and all related index spaces to a stop mode; (3) marking required space map entries as used; (4) loading previously processed data into the claimed data pages; (5) updating database index pages; (6) resetting the consistency tokens in each updated page; and (7) switching the tablespace and all related index spaces to a start mode.

In a further aspect, embodiments of the invention provide a method as described above wherein the batch processing comprises at least one of batch encryption and batch decryption.

In still another aspect, embodiments of the invention provide a method as described above wherein the bulk loading is performed in either an on-line or an off-line mode.

In even another aspect, embodiments of the invention provide for a computer program stored on a computer readable medium and including computer program code for executing in a processor and memory coupled to the processor to alter the operation of the computer for performing a method for the bulk loading of data as described above.

In still another aspect, embodiments of the invention provide a system for the bulk loading of data into the tables of a database with exit routines defined for operations on such tables, the system including: means for by-passing the existence of exit routines and for performing data preprocessing in batch mode before loading; and means for loading the pre-processed data into the database by performing operations on the lower level of tablespace and index spaces where the database tables reside and not on the database tables themselves.

In yet another aspect, embodiments of the invention provide a system for performing a method for the bulk loading of data into the tables of a database with exit routines defined for operations on such tables, the system comprising: means for batch processing of the data that requires processing to generate processed data; means for switching of the tablespace and all related index spaces to a stop mode; means for marking required space map entries as used; means for loading previously processed data into the claimed data pages; means for updating database index pages; means for resetting the consistency tokens in each updated page; and means for switching the tablespace and all related index spaces to a start mode.

In still another aspect, embodiments of the invention provide a system comprising: a coordinator responsible for reading user directives and work environment parameters, for initializing a work environment, and for validating user directives by referring to a database catalog and meta data for an encryption process, and for instantiating a plurality of resource managers; the resource managers an input/output manager, a data buffer manager, a sort manager, an optional Data Base Management System (DBMS) Manager, a worker thread manager, and a worker queue manager; and the input/output manager being responsible for reading-in and writing-out data through a media manager, the media manager being selected from the set of media managers consisting of the Sort Manager, the Data Buffer Manager, and the DBMS Manager.

DETAILED DESCRIPTION OF EXEMPLARY EMBODIMENTS

A system, apparatus, method and computer program stored on a computer readable media is provided for a mass or bulk data loader for use with databases, such as for example an IBM DB2 database running on the IBM z/OS operating system. The invention also provides system and method for means and procedures for implementing bulk operations on database tables with exit routines defined for operations on such tables. Embodiments of the system, method, apparatus and computer program may alternatively be implemented for other databases and other operating systems. The specific embodiments described here represent exemplary instances of the present invention, and are illustrative in nature rather than restrictive. The IBM DB2 database running on the IBM Z/OS operating system is used as an exemplar for describing embodiments of the invention at least in part because this combination of database and operating system is in widespread commercial use at the time of filing of this patent application, and because the problems presented by this combination are significant. References to the DB2 database are therefore to be understood to be references to other databases to avoid excessively wordy descriptions and long lists of alternatives.

In the following description, for purposes of explanation, numerous specific details are set forth in order to provide a thorough understanding of the invention and of particular exemplary embodiments of the invention. It will be apparent, however, to one skilled in the art that the invention can be practiced without these specific details. In other instances, structures and devices are shown in block diagram form in order to avoid obscuring the invention with excessive details.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

It will become apparent in light of the description provided here, that embodiments of the invention provide a method for the bulk loading of data into the tables of a database with exit routines defined for operations on such tables where the method by-passes the existence of exit routines by performing data processing in batch mode before loading, and where the loading of the preprocessed data into the database is not by performing operations on the database tables, but by performing operations on the lower level of tablespace and index spaces, where the database tables reside. Although not limited to IBM DB2 type databases, this method is particularly useful in IBM DB2 type databases executing on an IBM Z/OS type operating system.

Embodiments of the invention for both application to off-line bulk loading and to on-line bulk loading are described. These two different application environments are described in turn.

Exemplary Embodiment of an Off-line Bulk Loading System and Method

A method is provided hereby to load data optimally in an off-line mode. Extensions of this method to work in an online mode are described in subsequent portions of this description.

The off-line mode may be characterized by the fact that the database tablespace and all the related index spaces for the loaded table are switched to the STOP state or more informally are stopped. As known in the art, a STOP state is a state of the database objects, like a tablespace database object, in which such objects are inaccessible for any on-line database transaction. A DB2 tablespace may for example be a VSAM type dataset that contains the rows of one or more DB2 tables. Utilities, commands, and the like are run against DB2 tablespaces rather than against DB2 tables. The data being loaded into the database is then written directly into the appropriate data pages of the tablespace. Indexes are updated by merging the pre-existing indexes with the loaded entries, and sorted by available sorting utilities provided by the operating system, such as for example DFSORT in Z/OS. After the merge, indexes are loaded back into the index spaces. On successful completion of the off-line bulk load, the tablespaces and index spaces may be made available for regular use by switching their state to START state. A START state is a state of a database object, such as a tablespace or an index, in which it is available for on-line database transactions.

Off-line loading of data into a database may be considered to be efficient when the table is not processed one table row at a time, but when the loaded data is processed in batches (where the batches include at least a plurality of rows) as part of the operating system's data sets.

Efficient off-line bulk loading of encrypted data, as described in the previous paragraph, may not be implemented by using the IBM DB2 supplied "LOAD" utility, because loaded data may not be encrypted before loading. The IBM LOAD utility performs a limited set of operations on the loaded data, which do not include encryption (or decryption) operation. Implementation of an encryption interface via exit routines defined for the DB2 tables makes it necessary to process each row of the table with inserted data one-by-one (e.g., row-by-row), by invoking exit routines for each row with a field that requires encryption, before insertion of the data into the tablespace. This DB2 "LOAD" utility and like utilities impose significant impediments to rapid and efficient bulk data loading when exit routines are defined for the loaded table. It may be appreciated that the LOAD utility may be efficient when there are no exit routines involved, and it is the presence of exit routines that the LOAD routine becomes slow and inefficient. It is therefore in situations where there are exit routines (or exit routine-like program constructs) where embodiments of the invention provide the most significant efficiency improvements. In order to make the loading process faster and more efficient in this case, embodiments of the inventive system, method, and computer program provide that the data will be encrypted and loaded in batches.

An exemplary non-limiting embodiment of a method for bulk loading of encrypted data in an off-line mode is now described. The processing flow is also depicted in the flow chart diagram of FIG. 1. This exemplary method performs the encryption of the loaded data and the loading of the data in batches, and not one row at a time (e.g., row-by-row) as in conventional methods.

Batch encryption of the data that require encryption. First (Step 201), data that requires encryption is identified (if not already identified) and encrypted in a batch encryption procedure. Some conventional batch encryption processes are known for on-line encryption, however, the method and manner in which batch encryption for loading data into database tables, such as into IBM DB2 tables without using exit routines as described below is not known in the prior art. It may be appreciated that although a goal of embodiments of the invention is to provide encryption and/or decryption processing in a bulk mode, other embodiments of the invention may perform bulk operations other than encryption, decryption, and that the invention is not only limited to such encryption, decryption, or other cryptographic operations. This applies to both off-line mode operations and processing as well as to on-line mode operations and processing described herein below.

Switching of the tablespace and all related index spaces to STOP mode. Next (Step 202), the tablespace and all index spaces related to the database table being loaded are switched or changed to a stop state (e.g., to the STOP state in DB2) so that the tablespace itself and any index spaces related to the data being loaded become inaccessible for any on-line database transaction. Stop state and the commands to stop and start database objects are known in the art and not described in greater detail here to avoid obscuring aspects of the invention.

Marking required space map entries as used. Claiming necessary pages from the tablespace by marking any required entries in the space map pages as used (Step 203). Space map pages contain information about free and occupied pages in a DB2 page set. Space map pages and marking them as used are known for DB2 implementation and not described in greater detail here. This step identifies a way to allocate a set of pages for the subsequent steps described below. Space map pages in a DB2 implementation contain information about free space available on pages in a DB2 page set. Space map entries are entries in the space map pages described above. Space map entries are well known in DB2 implementations and not described in further detail here.

Loading Previously encrypted data into the claimed data pages (and optional loading of the preformatted data pages). Loading (Step 204) the previously encrypted data (See Step 201) into the data pages claimed in the previous step (See Step 203). Pages used for loading of data may optionally but advantageously be preformatted. Pre-formatting is well-known for DB2 in that the data pages which contain DB2 records must be formatted in a particular way. This formatting may be performed during record insertion, but optionally the pages may be preformatted or prepared for storing records before actual insertion takes place. Doing this before hand may enhance efficiency.

Updating database index pages. Next, database index pages are updated (Step 205). The updating may include inserting index keys into appropriate index pages of a page set, and possibly splitting pages if such page splitting is needed based for example on the values of inserted indexes. Splitting of index pages may for example be necessary in order to maintain order in the index page. Indexes are rather complex data structures, which are designed to optimize different, sometimes conflicting requirements. Given this complexity and the fact that indexes and index pages as well as conditions under which page splitting may be required are well known database concepts, we do not attempt to describe them in greater detail here to avoid obscuring the invention.

Resetting the consistency tokens in each updated page. Consistency tokens are used to identify versions of database objects and are reset (Step 206) for each page that is updated by the process described in the previous paragraphs, for example the insertion of keys into the index pages and the splitting of the pages described above represent situations where a page will be updated.

Switching the tablespace and all related index spaces to START mode. Finally (Step 207), the tablespace and all related index spaces are switched back from the stop state (e.g., DB2 STOP state) to a start state (e.g., DB2 START state) so that the tablespace itself and any related index spaces again become accessible for any on-line database transaction as may occur or be desired.

It will be appreciated that the inventive method may readily be implemented as a computer program written as software for executing in a processor and memory of a general purpose or special purpose computer. Therefore, having described a non-limiting but exemplary embodiment of an off-line method for bulk off-line processing of data, such as bulk off-line encryption or decryption, attention is now directed to a description of a non-limiting embodiment of an exemplary system configuration primarily focusing on software modules or components that support the inventive method described above. In one embodiment, a computer program is provided is provided and referred to for ease of description as a data utility program or as "DataUtil" as an abbreviation.

Figure 2:
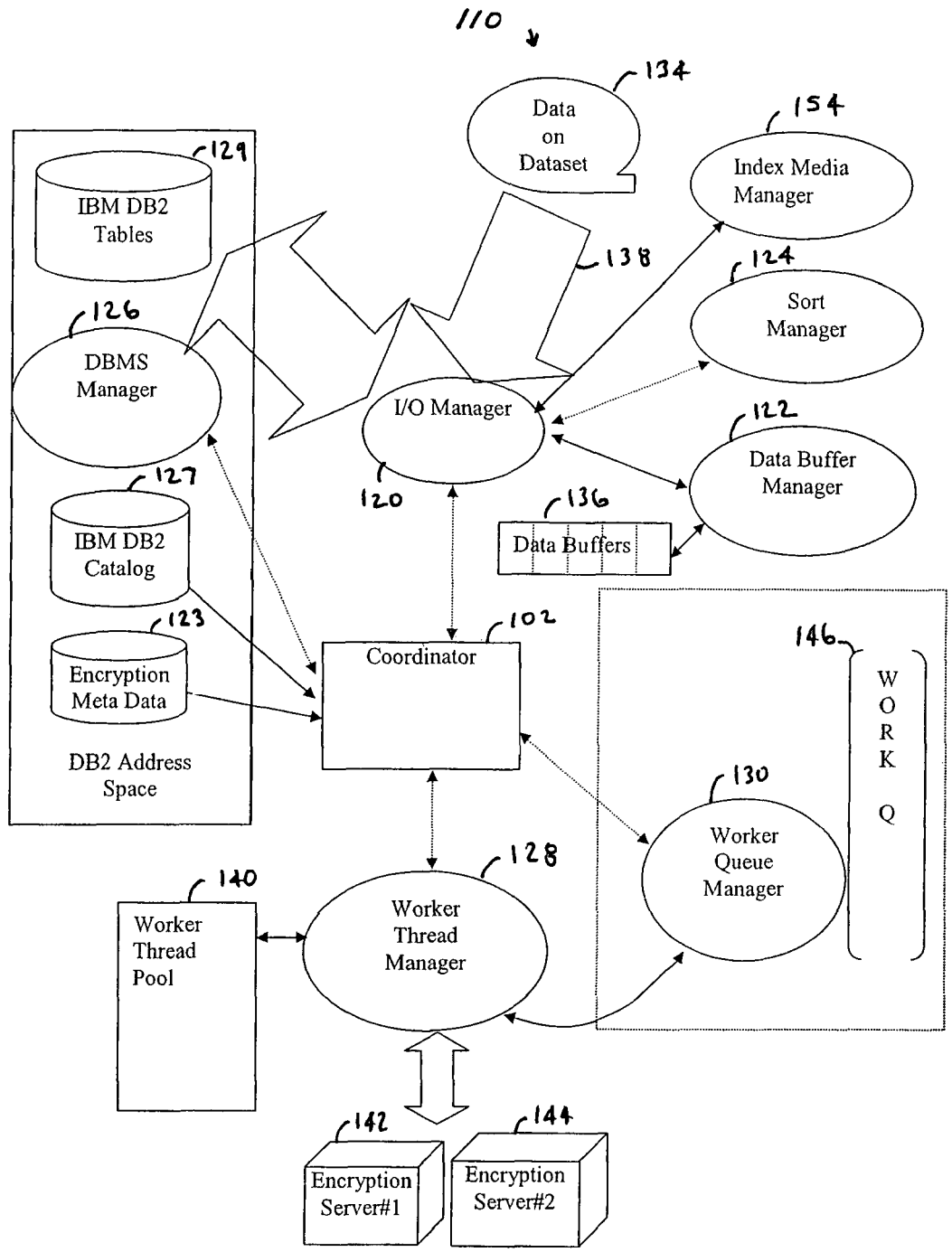
FIG. 2 is a diagrammatic illustration showing an exemplary software organization, interaction, and flow for components in a system and software configuration according to an embodiment of the invention.

FIG. 2 is a diagrammatic illustration showing an exemplary software organization, interaction, and flow for components in a system and software configuration according to an embodiment of the invention.

One of the main components of the system 110 is called the Coordinator 102, which is responsible for reading user directives 104 and work environment parameters 106, initializing the work environment 108 and continuing to validate the user directives in a validation sub-process by referring to the database catalog 110 (such as IBM DB2 catalog) and Meta Data 112 for the encryption process. Examples of possible meta data may include names, sizes, and data types of the columns that need encryption, encryption key names, and/or other parameters or data. Upon successful completion of the validation sub-process, the coordinator 102 may instantiate the other resource managers. Resource managers in one non-limiting embodiment may include an input/output manager 120, a data buffer manager 122, a sort manager 124, a Data Base Management System Manager (DBMS Manager) 126, a worker thread manager 128, and a worker queue manager 130. Although there may be many different types of work environment parameters, non-limiting examples of such environment parameters include the level of error logging, the location of the log file, the address of a network-attached server used for data encryption, or the like kind of work environment parameters. Non-limiting examples of possible user directives include the location of files used as input for bulk loading, a description of the record structure of such files, and the like.

Input/Output (I/O) Manager 120 may be a specialized data access component that can read-in and write-out data through the appropriate Media Managers, such as the Sort Manager 124, the Data Buffer Manager 122, and the DBMS Manager 126. The Input/Output Manager 120 not only may handle the I/O requirements but also may optionally log errors, and if possible, may attempt to recover from errors. The Input/Output Manager 120 may also optionally schedule an asynchronous pre-fetch of required records, pages, or other data, for example. The DB2 Catalog 127 provides a repository of DB2 metadata as is known in the art, and stores the description of various data structures in the database, and of the processing the database does with the data. DB2 tables 129 are also known in the art and are the repositories of the data stored in the database.

The pages fetched from the input source 138 which may be a data on a dataset 134 are buffered in data buffers 136 and managed by the Data Buffer Manager 122. An appropriate request is scheduled in the Work queue (WORK Q) 146 managed by Worker Queue Manager 130. This request is then picked up by one of the available worker threads from the Worker Thread Pool 140 which is managed by the Worker Thread Manager 128, and the Worker thread that picked up the requests acts on that request. Encryption may typically be part of the Worker Thread processing and may be handled by an available encryption servers such as by one or more of a plurality of encryption servers 142, 144.

Input/Output Manager 120 may also pass appropriate portions of the database records from the database space (such as DB2 database address space) 150 to the SORT Manager 124. The Sort Manager 124 may be seen as working as a kind of an extension of a sort utility at the site. The data utility or "DataUtil" software may optionally use a combination of hyperspaces and work files as intermediate storage. The hyperspaces are special areas of main memory such as may be established by the operating system, such as by the IBM Z/OS operating system as is often used with the DB2 database. Work files may for example be or include, but are not limited to Virtual Storage Access Method (VSAM) files, which are a type of very fast random access file system that allows non-sequential retrieval of records based on the value of keys within them. Such files may for example be stored on DASD (Direct Access Storage Devices) type devices.

The data transformed by Sort Manager 124 and by the worker threads processes (transformed data) is then formatted in the Data Buffers 136 managed by the Data Buffer Manager 122 and is scheduled by the I/O Manager 120 to be written to the tablespace being processed by the bulk load process. The transformed data is then passed to the Sort Manager 124, where it is sorted according to one or a plurality of sort criteria and made available to the appropriate Index Media Manager 154. This Index Media Manager processes the sorted index data and writes it back to the index pages using any of the bulk loading algorithms, such as for example one of the Disk based B+tree bulk loading algorithms, or other bulk loading algorithms as are known in the art or to be developed.

A Data Base Management System Manager (DBMS Manager) 126 is an optional database resident (e.g., DB2 database resident) component that hooks into the database (e.g., the DB2 database) and optionally interacts with its various components to facilitate one or more of several possible concurrent features. Exemplary concurrent features may for example include but are not limited to, serialization for on-line processing, notifying various database (e.g., DB2 database) internal structures of the concurrent backup, collecting data statistics for various tasks, and the like. DBMS Manager 126 may optionally also be responsible for establishing frequent consistency points with the database (e.g., the DB2 database). These optional consistency points may be used for error recovery and continuation of processing.

In light of the description provided above, it will be appreciated that one advantage of the method and software system described in this configuration is that it allows off-line bulk loading of encrypted data into database tables, such as DB2 tables, as outlined above. Attention is next directed to a method and software system for on-line bulk loading of encrypted data into database tables.

Exemplary Embodiment of an On-line Bulk Loading System and Method

An embodiment of an off-line bulk loading method and system has been described. When running or operating in an on-line mode, and performing an on-line bulk loading operation procedure, the strategy is slightly different than for the off-line bulk loading method described above. The on-line state is a state in which the tablespace and all related index spaces are maintained in the start state (e.g., the DB2 START state), that is, in a state that makes these tablespace and related index spaces components of the database remain accessible to other processes in the system while the data utility (e.g., DataUtil) is performing its processing, rather than the stop state as when the data utility (e.g., DataUtil) is doing off-line bulk loading. A data utility such as DataUtil will let tablespace and index spaces remain in START mode while doing its on-line bulk loading, therefore allowing normal processing to continue while the data utility (e.g., DataUtil) runs, thus allowing uninterrupted operations.

In order to achieve such on-line operation in conventional systems and methods, from at least the exemplary DB2 database point of view is through the use of DB2 Locks, DB2 Latches, and by using the DB2 share level change (e.g., DB2 SHRLEVEL CHANGE) option. However, that standard or conventional way of performing an on-line bulk loading of data, imposes an overhead that makes such conventional on-line bulk loading an impractical solution, as it will consume too many resources and take too long to complete.

The conventional approach, especially for a DB2 database and the Z/OS operating system, may be particularly problematic because all the DB2 exit routines remain active which adds even more to the overhead, and also because of the way DB2 Locks operate. DB2 Locks consume substantial additional system resources because of their inter-address space communication overhead. These DB2 Locks are sent to an Information Management System (IMS) Resource Lock Manager (IRLM) region, which operates in a different address space than the DB2 address space, and is conventionally responsible for such implementations.

Recall that when running or operating in the off-line mode, tablespaces are set to the STOP mode, and when in the STOP mode, there are no Locks or Latches that could happen. Therefore, for off-line bulk loading operation, these locks and latches are not a relevant concern.

In order to achieve acceptable performance results for an on-line bulk loading of data, the inventive process as implemented for example in a data utility (e.g., DataUtil) removes any usage of DB2 Locks mechanism. In order to achieve the same results as the Lock process, the data utility (e.g., DataUtil) control access to tablespace and index spaces (that we call resources) through the Coordinator module 102 through the use of an internal indicator that determines if access to such resources (e.g., access to tablespace and index spaces) are permitted. It does so in a very granular fashion, in order to enable other processes to still be able to access these resources, and yet while still enabling the data utility (e.g., DataUtil) to be actively updating these same resources. This internal indicator controls and prohibits access to a resource currently being updated by the data utility (e.g., DataUtil) to other system components (including exits) by making them wait for a period of time, but only for an amount of time short enough to not impact these other system component processes significantly (in term of processing time). The coordinator operates in on-line mode by effectively breaking apart and time-multiplexing or time-splicing a process that would usually be done in one step in the off-line mode, into a plurality or multiplicity of small steps in on-line mode.

In one non-limiting embodiment, this internal indicator (referred to as an "exec_flag" for the purpose of the following example) may for example be a semaphore that is exclusively updated by the Coordinator 102 and that signals or indicates whether it is possible (or permitted) or not possible (not permitted) for a given logical unit of work (that wants to access the same DB2 resources as DataUtil) to get started.

By a logical unit of work we mean a beginning and an end point for a portion of a given task to be done in one time splice unit, that we call a "time slot", that is small enough time-wise to ensure a high degree of granularity in the context of on-line processing, and that could not be interrupted.

In one non-limiting embodiment a rule or policy is implemented such that if a given logical unit of work can't start, it is because exec_flag (executive flag) indicates a state of disable, which means a DataUtil logical unit of work controls the wanted resource for cryptographic (for example, encryption and/or decryption) or any other input/output operations on the database, such as a DB2 database. In such a situation, that logical unit of work is placed in the Work queue 146 to wait for an available time slot, and that logical unit of work will be selected for execution on a first in/first out (FIFO) basis in the next available time slot.

A time slot may be a variable unit of time that is available to any logical unit of work. A time slot can belong to a DataUtil logical unit of work or to other task logical unit of work. The Coordinator 102 is the one component responsible to sets exec_flag to "disable" when a DataUtil logical unit of work owns the current time slot, and then sets (or resets) exec_flag to "enable" when the current time slot is not owned by DataUtil. In one non-limiting embodiment, there can be only one active logical unit of work per tablespace (or any other data structure that needs serialization in its update processing) per time slot.

Once the data utility program (e.g., DataUtil) has completed its logical unit of work, the Coordinator sets exec_flag to a state of "enable". DataUtil will try to share as evenly as possible (or according to some non-even priority scheme if such scheme is desired) the available system processing time between itself and other processes in the system that want to gain access to the same database (e.g., DB2 database) resources. It may for example do so by assigning one logical unit of work for itself and then one logical of work for other tasks in the system, and then one for itself again and then one for other tasks, and so on. (Other different sharing schemes may alternatively be implemented.) This process may continue until the data utility (e.g., DataUtil) completes its processing. This is the way time splicing is done in DataUtil, that is, it is the division of system processing time between the data utility (e.g., DataUtil) and other processes in the system that want to access the same DB2 resources in term of logical unit of work.

This is one reason why it was earlier described that these time slots are advantageously of variable size, time-wise, as their length is derived by the length of a logical unit of work. In that whole process, the exec_flag indicator acts as a gate lock for other logical units of work on the resource that data utility (e.g., DataUtil) is currently updating. Once the data utility has completed its logical unit of work, the Coordinator sets or resets exec_flag in to "enable", in order to let other logical unit of work access a resource that was previously controlled by the data utility. The inverse is also true for the data utility (e.g., DataUtil), that is, it will wait until the current logical unit of work has completed, which will be signaled by the Coordinator 102 via the exec_flag indicator or signal.

Therefore, in the on-line mode, the data utility (e.g., DataUtil) operates by time-splicing as described above, to execute a process that would usually be done in one step in off-line mode into multiple small steps in on-line mode. This time-splicing approach may usually take more time than execution as a single process in the off-line mode, however, as compared to operation in the off-line mode, it will provide continuous resource availability to other processes running on the system. Access to tablespaces and index spaces may therefore be substantially maintained by the inventive method even in the on-line bulk loading operating mode. Database (e.g., DB2 database) access to the data page processing is disabled only for short periods of time by the Coordinator module 102, using time-splicing of access to the data pages while the data utility (e.g., DataUtil) run in on-line mode.

It may be appreciated in light of the description provided herein that the inventive off-line and on-line embodiments of the method, software system, and indeed hardware system implementing the software system and inventive method have great similarities and a few differences a well. Rather than repeating the entire description for the on-line embodiment, differences between the on-line and off-line embodiments are now described.

A non-limiting embodiment of a method for off-line bulk loading and encryption is described herein above as including seven steps, highlighted below:
   (1) Batch encryption of the data that require encryption
   (2) Switching of the tablespace and all related index spaces to STOP mode
   (3) Marking required space map entries as used
   (4) Loading previously encrypted data into the claimed data pages and optional loading of the preformatted data pages
   (5) Updating database index pages
   (6) Resetting the consistency tokens in each updated page
   (7) Switching the tablespace and all related index spaces to START mode In the on-line mode, only the step (2) of switching of the tablespace and all related index spaces to STOP mode, and the step (7) of switching the tablespace and all related index spaces to START mode, are modified. The other steps (1), (3), (4), (5), and (6) may have the same functionality, operation, and implementation. They may also use the same system and software infrastructure, such as the infrastructure describe herein above relative to the off-line mode.

In the on-line mode, the step (2) of switching the tablespace and all related index spaces to STOP mode, is handled by the exec_flag semaphore (described above) and in one-non-limiting embodiment is alternated evenly between enable/disable at each time slot change until the data utility (e.g., DataUtil) on-line execution is completed. Analogously, the step (7) of switching the tablespace and all related index spaces to START mode, is likewise handled by the exec_flag semaphore and in one-non-limiting embodiment is alternated evenly between enable/disable at each time slot change until the data utility (e.g., DataUtil) on-line execution is completed, just as for step (2). It will be appreciated that these two steps comprise complementary operations and involve switching between the stop and start states, or viewed differently between enable and disable.

It will be apparent therefore that at a top level, the off-line method illustrated in the flow-chart diagram in FIG. 1 also applies to the on-line method just described, and that the differences arise in the details of how two of the steps are implemented. In similar manner, the system depicted in FIG. 2 is applicable to both off-line and on-line processing, but that some components may include somewhat different features as described. For example, the Coordinator Module 102 exercises additional control and coordination responsibilities and interacts with the exec_flag indicator or signal to implement the time-splicing.

One way to further increase efficiency in on-line mode is by using an optional module pre-loading procedure. Using module pre-loading may advantageously improve real-time execution speed while in online mode. Module pre-loading is more advantageous in on-line mode (than in off-line mode where it may also be implemented) because of the above mentioned time splicing process that online mode utilizes.

Therefore, module pre-loading may optionally but advantageously be used to further reduce overhead, including to reduce I/O overhead. Module pre-loading refers to a process or method by which executable modules, tablespace, index spaces, and/or any other software components are loaded one time only into memory rather than repeatedly as may occur in conventional system and methods. Loading these executable modules, tablespace, index spaces, and/or any other software components only a single time and then retaining the memory location (address) of the loaded component for later use provides an opportunity to reduce or maintain I/O overhead to its minimum, and therefore reduce significantly the total elapsed time (real time) for online processing.

One skilled in the art in light of the description provided herein will appreciate that although specific examples and embodiments of the system and methods have been described for purposes of illustration, various modifications can be made without deviating from present invention. For example, embodiments of the present invention may be applied to many different types of databases, systems and application programs. Moreover, features of one embodiment may be incorporated into other embodiments, even where those features are not described together in a single embodiment within the present document.

We claim:

1. A method for the bulk loading of data into the tables of a database with exit routines defined for operations on such tables, the method comprising:
   by-passing the existence of exit routines by performing data preprocessing transforming the data in batch mode before loading; and
   loading the transformed preprocessed data into the database by performing operations on the lower level of tablespace and index spaces where the DB tables reside and not on the database tables themselves, the method further comprising:
   (1) switching the tablespace and all related index spaces to a stop mode;
   (2) marking required space map entries as used;
   (3) loading said preprocessed data into the claimed data pages;
   (4) updating database index pages;
   (5) resetting the consistency tokens in each updated page; and
   (6) switching the tablespace and all related index spaces to a start mode.

2. A method according to claim 1, further comprising:
   switching database objects alternately between an accessible state and an inaccessible state, and while in an accessible state:
   (i) identifying needed resources for data to be loaded;
   (ii) carrying out said loading of the data into the database; and
   (iii) updating the database to reflect the changes resulting from the loading.

3. A method as in claim 1, wherein the transforming comprises at least one of batch encryption and batch decryption.

4. A method as in claim 1, further comprising, after the step of loading previously encrypted data into the claimed data pages, loading of preformatted data pages.

5. A method as in claim 1, wherein the bulk loading is performed in an off-line mode.

6. A method as in claim 1, wherein the bulk loading is performed in an on-line mode.

7. A method as in claim 5, wherein the database includes a table and the table has an associated table space and index space related to the table space, and the off-line mode is a mode in which the database table space and the related index space for the table are switched to a stop state.

8. A method as in claim 7, wherein the stop state is a state of a database objects in which the objects are inaccessible for any on-line database transaction.

9. A method as in claim 8, wherein the database objects comprise the database table space and the related index space for the table.

10. A method as in claim 1, wherein the database comprises an IBM DB2 database.

11. A method as in claim 10, wherein the table spaces comprise DB2 tablespaces that include the rows of one or more DB2 table.

12. A method as in claim 11, wherein data being loaded into the database is written directly into data pages of the tablespace.

13. A method as in claim 1, wherein the bulk loading is performed in an on-line mode in which mode the step of switching of the tablespace and all related index spaces to stop mode and the step of switching of the tablespace and all related index spaces to start mode are handled by a semaphore and provides for alternating between an enable state and a disable state at alternating time slots until the on-line processing task execution is completed.

14. A method as in claim 13, wherein the semaphore is implemented as an executive flag (exec-flag) indicator that signals the enable or disable state.

15. A method as in claim 6, wherein the on-line bulk loading is implemented using a time splicing procedure for alternating database objects between a locked state and an unlocked state.

16. A method as in claim 1, wherein the database is an IBM DB2 database running under an IBM Z/OS operating system.

17. A method as in claim 1, wherein the processed data comprises cryptographically encrypted data.

18. A computer program stored on a non-transitory computer readable storage medium and including computer program code for executing in a processor and memory coupled to the processor to alter the operation of the computer for performing a method for the bulk loading of data into the tables of a database with exit routines defined for operations on such tables, the method comprising:

(1) batch processing of the data that requires processing to generate transformed data before loading with bypassing of the exit routines;
(2) switching of the tablespace and all related index spaces to a stop mode;
(3) marking required space map entries as used;
(4) loading previously transformed data into the claimed data pages by performing operations on the lower level of tablespace and index spaces where the DB tables reside and not on the database tables themselves;
(5) updating database index pages;
(6) resetting the consistency tokens in each updated page; and
(7) switching the tablespace and all related index spaces to a start mode.

19. A system for the bulk loading of data into the tables of a database with exit routines defined for operations on such tables, the system comprising a computer having a processor and including:
   means for by-passing the existence of exit routines and for performing data preprocessing transforming the data in batch mode before loading;
   means for loading the transformed preprocessed data into the database by performing operations on the lower level of tablespace and index spaces where the database tables reside and not on the database tables themselves;
   means for switching of the tablespace and all related index spaces to a stop mode;
   means for marking required space map entries as used;
   means for updating database index pages;
   means for resetting the consistency tokens in each updated page; and
   means for switching the tablespace and all related index spaces to a start mode.

20. A system as in claim 19, wherein each of the means for batch processing, means for switching to a stop mode, means for marking, means for loading, means for updating, means for resetting, and means for switching to a start mode comprise a computer program module including executable code for execution in a processor.

21. A system according to claim 19, further comprising:
   a coordinator responsible for reading user directives and work environment parameters, for initializing a work environment, and for validating user directives by referring to a database catalog and meta data for an encryption process, and for instantiating a plurality of resource managers;
   the resource managers an input/output manager, a data buffer manager, a sort manager, an optional Data Base Management System (DBMS) Manager, a worker thread manager, and a worker queue manager; and
   the input/output manager being responsible for reading-in and writing-out data through a media manager, the media manager being selected from the set of media managers consisting of the Sort Manager, the Data Buffer Manager, and the DBMS Manager.

* * * * *